United States Patent
Ventura et al.

(10) Patent No.: US 9,381,445 B2
(45) Date of Patent: Jul. 5, 2016

(54) DISTANCE DETECTOR

(71) Applicant: Zebra Innovations, LLC, Dover, DE (US)

(72) Inventors: Robbie Ventura, Wildwood, IL (US); Michael D. Paley, Deerfield, IL (US); Robby Ketchell, Portsmouth, NH (US)

(73) Assignee: Zebra Innovations, LLC, Dover, DE (US)

(*) Notice: Subject to any disclaimer, the term of this patent is extended or adjusted under 35 U.S.C. 154(b) by 60 days.

(21) Appl. No.: 14/211,771

(22) Filed: Mar. 14, 2014

(65) Prior Publication Data

US 2014/0277637 A1 Sep. 18, 2014

Related U.S. Application Data

(60) Provisional application No. 61/788,226, filed on Mar. 15, 2013.

(51) Int. Cl.

| | | |
|---|---|---|
| *G06F 17/10* | (2006.01) | |
| *G06F 19/00* | (2011.01) | |
| *A63B 21/005* | (2006.01) | |
| *B60Q 1/00* | (2006.01) | |
| *A63K 3/00* | (2006.01) | |
| *G01S 15/08* | (2006.01) | |
| *A63K 99/00* | (2006.01) | |
| *G01S 15/93* | (2006.01) | |
| *G01S 7/521* | (2006.01) | |

(Continued)

(52) U.S. Cl.
CPC . *A63K 3/00* (2013.01); *A63K 99/00* (2013.01); *G01S 7/521* (2013.01); *G01S 7/64* (2013.01); *G01S 15/08* (2013.01); *G01S 15/931* (2013.01); *G01S 15/025* (2013.01)

(58) Field of Classification Search
USPC .................. 701/301; 700/91; 482/5; 340/436
See application file for complete search history.

(56) References Cited

U.S. PATENT DOCUMENTS

| | | |
|---|---|---|
| 4,290,047 A | 9/1981 | Latta, Jr. |
| 5,005,661 A | 4/1991 | Taylor et al. |
| 5,491,475 A * | 2/1996 | Rouse .................... G08G 1/042 324/244 |

(Continued)

OTHER PUBLICATIONS

Fister, Iztok and Fister Jr. Iztok, Concept of Drafting Detection System in Ironmans, Electrical Review, vol. 78 No. 4, pp. 217-222, year 2011.*

(Continued)

*Primary Examiner* — Thomas G Black
*Assistant Examiner* — Tyler Paige
(74) *Attorney, Agent, or Firm* — Fitch, Even, Tabin & Flannery LLP

(57) ABSTRACT

A distance detecting device is mounted on a user's vehicle to detect a distance between the user's vehicle and a leading vehicle moving in front of the user's vehicle. The distance detecting device communicates with a processing device, which applies race based distance rules to determine whether the user's vehicle is close to or incurring a penalty based at least on the distance between the user's vehicle and the leading vehicle. An indication can be given to the user regarding an impending penalty and/or when a penalty is incurred. Similarly, the device can be read to apply a penalty. Various modifications can be made to allow for recording, display, and transmission of racing and penalty statistics, enabling and disabling recordation of penalty occurrences, tailoring the penalty determinations to a given race, and mounting the distance detecting device to a vehicle.

28 Claims, 5 Drawing Sheets

(51) Int. Cl.
*G01S 7/64* (2006.01)
*G01S 15/02* (2006.01)

(56) References Cited

U.S. PATENT DOCUMENTS

| | | | |
|---|---|---|---|
| 5,547,439 A * | 8/1996 | Rawls | A63B 24/00 |
| | | | 482/3 |
| 6,326,886 B1 | 12/2001 | Hoffsommer | |
| 6,731,202 B1 | 5/2004 | Klaus | |
| 6,879,248 B2 | 4/2005 | Flick | |
| 6,921,351 B1 * | 7/2005 | Hickman | A63B 24/0084 |
| | | | 482/4 |
| 7,047,804 B1 * | 5/2006 | Lawrence | A63B 69/16 |
| | | | 73/170.01 |
| 7,079,024 B2 | 7/2006 | Alarcon | |
| 7,518,491 B2 | 4/2009 | Oda et al. | |
| 7,586,405 B1 | 9/2009 | Brandenburg | |
| 7,626,888 B2 | 12/2009 | Nakano et al. | |
| 7,688,187 B2 | 3/2010 | Caird et al. | |
| 8,280,308 B2 | 10/2012 | Anschutz et al. | |
| 2003/0024310 A1 * | 2/2003 | Montagnon | B62J 99/00 |
| | | | 73/489 |
| 2006/0085125 A1 * | 4/2006 | Shibata | G01C 21/365 |
| | | | 701/414 |
| 2009/0273456 A1 | 11/2009 | Albertini | |
| 2011/0133918 A1 * | 6/2011 | Lee | B62J 99/00 |
| | | | 340/436 |
| 2011/0282621 A1 * | 11/2011 | Simpson | G07C 1/24 |
| | | | 702/149 |
| 2012/0081233 A1 | 4/2012 | Niel | |
| 2012/0218124 A1 | 8/2012 | Lee et al. | |
| 2014/0172135 A1 * | 6/2014 | Eisner | G06F 15/17306 |
| | | | 700/91 |
| 2014/0277637 A1 * | 9/2014 | Ventura | A63K 3/00 |
| | | | 700/91 |

OTHER PUBLICATIONS

Leonie Mervis, Backtracker the 6th sense for cyclists, Jun. 25, 2014; http://www.bicyclecapetown.org/2014/06/backtracker.the-6th-sense/.

Cui et al., Team 5: ECE Day '09 Quikitrak's Drafting Zone Detector Part 1, May 8, 2009; http://www.youtube.com/watch?v=8aF9s5N6jCw.

Cui et al., Team 5: ECE Day '09 Quickitrak's Drafting Zone Detector Part 2, May 8, 2009; http://www.youtube.com/watch?v=2NE__5ufbJ8E.

* cited by examiner

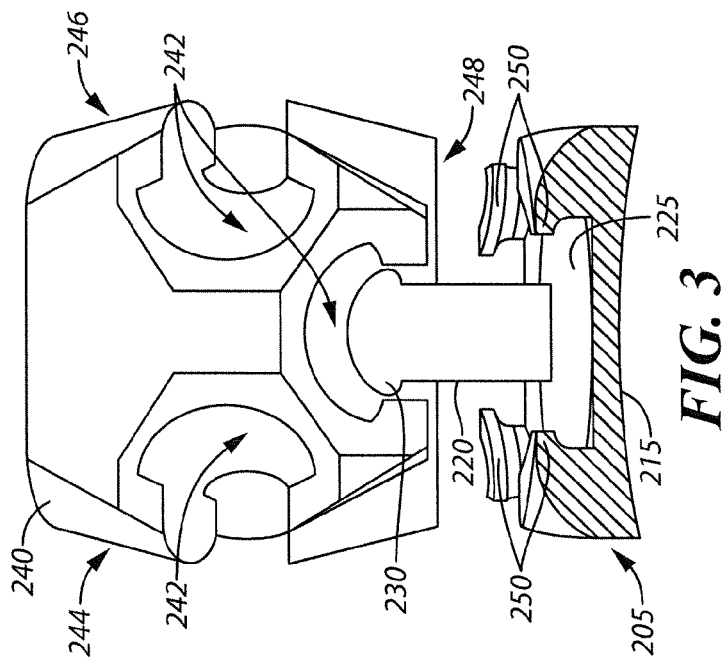
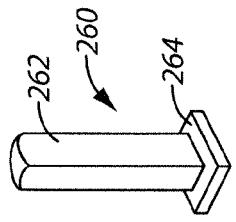
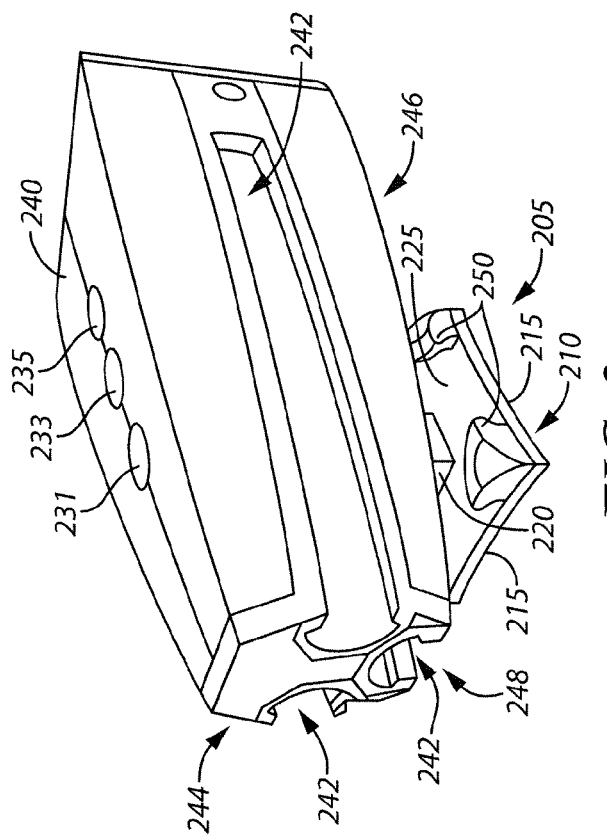
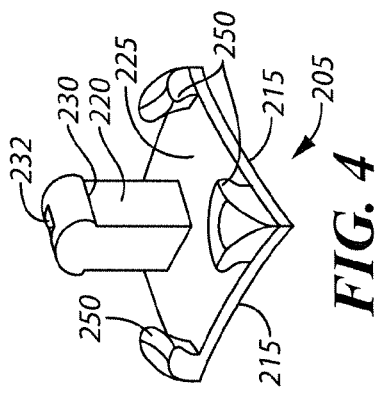

DISTANCE DETECTOR

RELATED APPLICATIONS

This application claims the benefit of U.S. provisional application No. 61/788,226, filed Mar. 15, 2013, which application is incorporated by reference in its entirety herein.

TECHNICAL FIELD

The present subject matter relates generally to distance detectors and more particularly to a distance detector for use in enforcing distance based regulations and related penalties in a race setting.

BACKGROUND

In various race settings, a racer can obtain an advantage by racing closely behind another racer. This advantage is caused by the leading racer's causing a disturbance in the air. The following rider generally will experience less drag by racing in the disturbed air created by the leading racer. Therefore, the following racer will exert less energy and effort by traveling in the disturbed air. Traveling in the disturbed air caused by another racer is called drafting.

Because of this advantage gained by drafting, various races have various rules regarding how long a following racer may travel within a given distance behind another racer. For example, in the biking portion of a triathlon, riders can only race within a given distance behind and within lateral distance to the side of a leading racer for a particular amount of time for a penalty is assessed against the drafting rider. Accurately assessing such penalties is difficult in a bicycle race setting, however, because judges cannot be effectively placed to cover an entire race course in a typical event.

SUMMARY

Generally speaking, and pursuant to these various embodiments, apparatuses and methods are described for monitoring distance behind a moving vehicle. In one example, the distance detecting device is mounted on a user's vehicle to detect a distance between the user's vehicle and a leading vehicle moving in front of the user's vehicle. The distance detecting device communicates with a processing device, which applies race based distance rules to determine whether the user's vehicle is close to or incurring a penalty based at least on the distance between the user's vehicle and the leading vehicle. An indication can be given to the user regarding an impending penalty and/or when a penalty is incurred. Various modifications can be made to allow for recording, display, and transmission of racing and penalty statistics, enabling and disabling recordation of penalty occurrences, tailoring the penalty determinations to a given race, and mounting the distance detecting device to a vehicle.

For instance, the distance detector and be configured to mount on any of several portions of a bicycle in an aerodynamic manner to notify a rider of whether he or she is riding within a penalty distance of another rider and whether a penalty is about to be assessed. This information can be transmitted to race officials to apply the correct penalty to the racer. So configured, race rules can be more accurately and consistently applied in a racing context.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 2 is a perspective view of an example distance detector in accordance with various embodiments of the invention.

FIG. 3 is a side view of one end of the example distance detector of FIG. 2.

FIG. 4 is a perspective view of the mount portion of the example distance detector of FIG. 2.

FIG. 5 is a perspective view of an example pin used with a mount in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
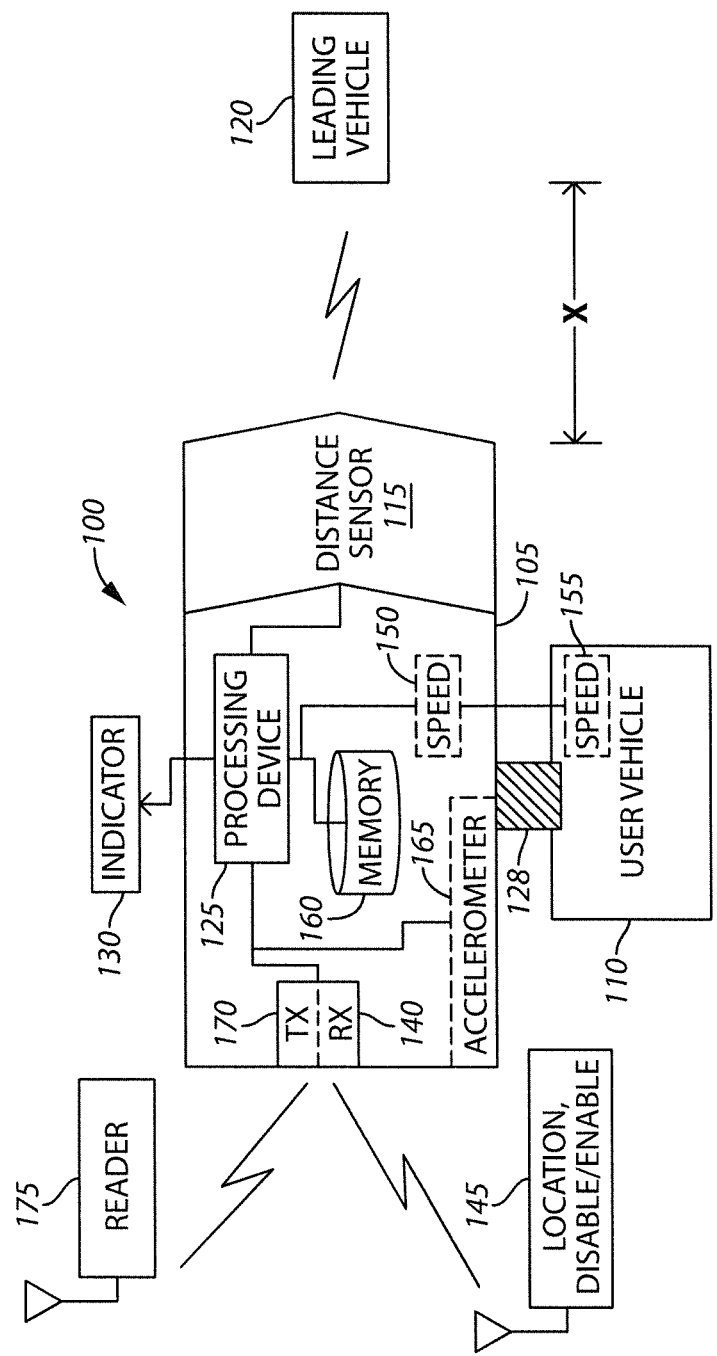
FIG. 1 is a block diagram of an example distance sensing device system in accordance with various embodiments of the invention.

Turning now to the drawings, and in particular to FIG. 1, an example apparatus 100 for monitoring distance behind a moving vehicle will be described. The apparatus 100 includes a housing 105 configured to mount to a user's vehicle 110. The housing 105 contains at least a distance sensing device 115 configured to output a signal proportional to a distance X between the distance sensing device 115 and a leading vehicle 120. Any self-contained distance sensor (one not needing a corresponding device on the object from which distance is measured) can be used. In one example, a sonar based sensor can be used, such as the XL-MAXSONAR—WR1 or WR2 sonar range finder from MAXBOTIX, although other such devices can be used. In such an example, the distance sensing device 115 will output a signal such as a voltage that is proportional to the distance between the senor and a sensed object, such as a leading vehicle 120. The leading vehicle 120 will change through the use of the apparatus as different vehicles take a position in front of the user's vehicle 110; accordingly, reference to a leading vehicle need not necessarily always refer to the same leading vehicle unless explicitly stated. The housing 105 also contains a processing device 125 in communication with the distance sensing device 115 to receive the signal.

Figure 6:
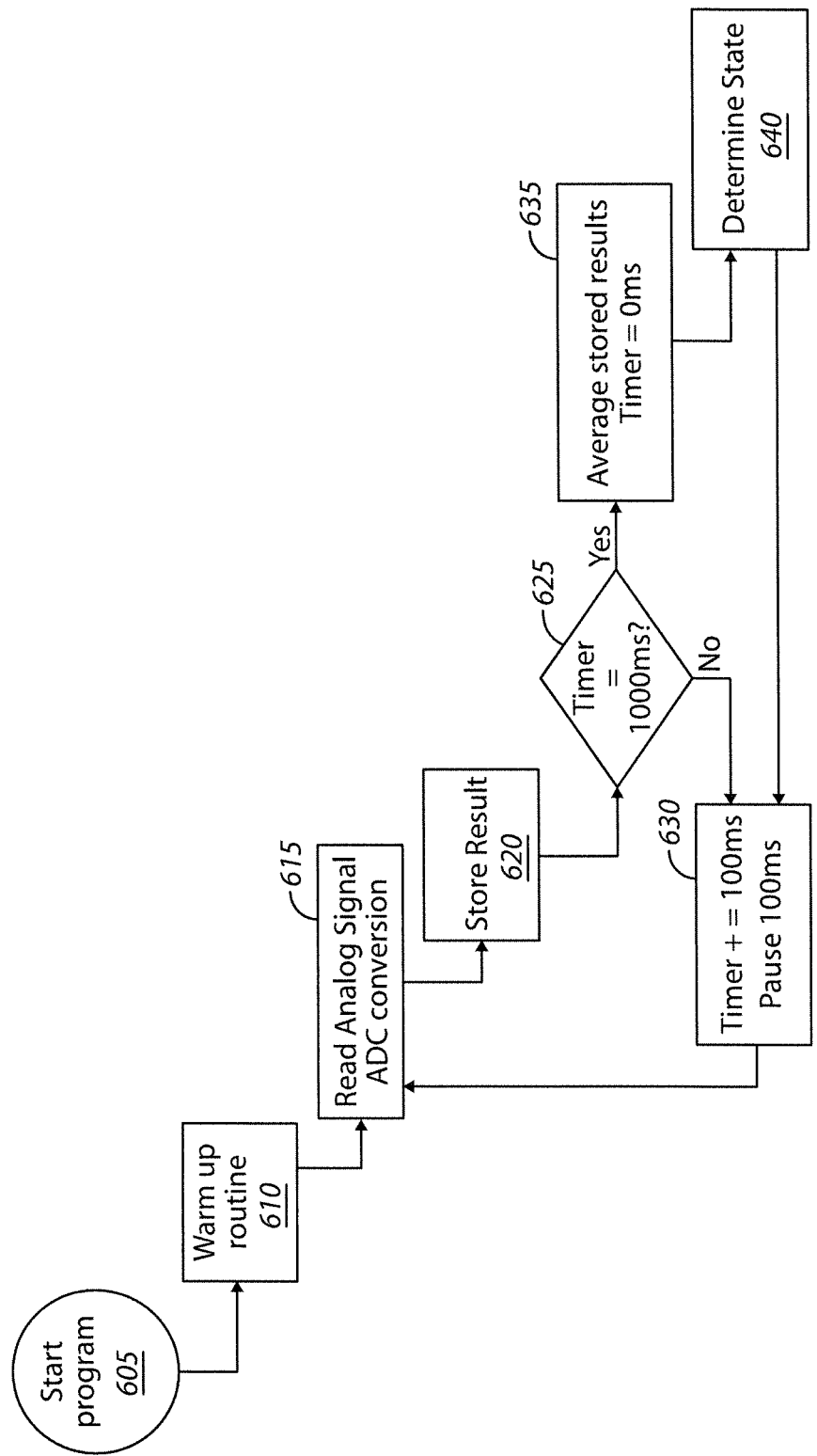
FIG. 6 is a flow chart illustrating an example process for reading signals from a distance sensing device in accordance with various embodiments of the invention.

With momentary reference to FIG. 6, one approach to reading the signal from the distance sensing device 115 will be described. To avoid having random erroneous signals causing erroneous determinations, the processing device 125 averages samples of the signal and uses the average in the algorithms discussed below for making determinations regarding the sensed distance. In the example of FIG. 6, after starting up 605 and completing a warm up routine 610, the processing device 125 reads an analog signal from the distance sensing device 115 and performs an analog to digital (ADC) conversion 615 to allow the processing device 125 to process digital signals corresponding to the analog signals output by the distance sensing device 115. To process the digital signals, they are stored 620. After the first signal is stored 620, a timer is started, and the process checks 625 whether the timer has reached 1000 milliseconds (1 second). If not, after 100 milliseconds has passed 630, another sample of the analog signal is read 615, converted to digital, and stored 620. In response to determining that the timer reached 1000 milliseconds 625 whereupon ten samples are stored, the stored samples or digital signal readings are averaged 635 (thus effecting a sampling rate of ten Hertz), and the timer is re-set to zero. The processing device 125 then uses the average result to determine the state 640 of the distance detector, i.e., how far away is a detected object such as a leading vehicle 120. Alternatively, the average result can be sent via a serial bus connection to another processing device for determining the state 640.

Referring again to FIG. 1, in various applications, the housing 105 of the apparatus 100 can be mounted using a mount 128 to the user's vehicle 110 in any suitable manner so that the distance sensing device 115 can reliably detect a leading vehicle 120. When used in a bicycle context, the housing 105 can be mounted to, for example, the handle bars, center support, wheel support, or the like. With reference to FIGS. 2-5, one example mounting system suitable for use on bicycles will be described. A mount 205 includes a base 210 defining a curved side 215 configured to engage a support surface of the user's vehicle 110. A shaft 220 extends from a side 225 of the base 210 opposite that of the curved side 215. The shaft 220 includes at least one flange 230. The housing 240 of this example defines a curved slot 242 on at least two of the housing's 240 sides 244, 246, 248. The curved slot 242 is sized to engage and receive the shaft 220 and the at least one flange 230 to securely position the housing 240 relative to the user's vehicle's 110 structure. This curved shape of the curved slot 242 allows for multiple places and angles at which the housing 105 can be mounted. Although the housing 105 is illustrated having a particular shape and size, the housing 105 can have a variety of shapes, sizes, and configurations and still meet any combination of the teachings of this disclosure. The mount 205 in this example includes a plurality of inwardly facing hooks 250 configured to hold an elastic member that can engage the hooks 250 and wrap around a portion of the bicycle to secure the mount 205. The curved side 215 of the mount 205 may include a friction surface to further secure the mount to the bicycle, preventing slipping.

FIG. 5 illustrates a pin 260 that inserts into the mount 205 through the middle of the shaft 220. The pin shaft 262 extends through the shaft 220 to engage an inner portion of the curved slot 242 of the housing 240. A flanged portion 264 of the pin 260 engages and is pressed by the user vehicle portion on which the mount 205 is attached. So configured, the pressure of the user vehicle portion on the flanged portion 264 pushed the pin 206 through the shaft's 220 aperture 232 to engage the housing 240 thereby locking the mount 205 and the housing 240 in place.

With respect to mounting on a bicycle, the device may be mounted at any of various different locations on a bicycle. For example, the device may be mounted directly on the handlebars, the head tube, or the front fork. Mounting on the front fork may be less than ideal because the front wheel may interfere with the device's operation. If the device is mounted on the left side of the front fork, for example, the device may have difficulty in reliably detecting a leading bicycle positioned ahead but slightly to the right. Also, if mounted on the front fork in proximity to the wheel, the device may be susceptible to damage in the event that it is displaced into contact with the wheel. As one possible solution to these problems, the device may be mounted on a cantilever extending forward from the fork or from the frame or handlebars. Alternatively, to provide a more rigid support, the device may be mounted on a strut extending from the fork to the handlebars. The strut may be rigidly connected to the handlebars and to the fork and may provide a range of positions for the device such that the device may be adjusted upward or downward along the strut to a suitable position.

Referring again to FIG. 1, an indicator 130 is operatively connected to receive signals from the processing device 125 to control provision of an indication to the user regarding application of distance based rules to the user's vehicle 110. The indicator 130 can comprise any indicator suitable to notify the user of the information regarding the distance and penalty aspects discussed herein. FIG. 2 illustrates three lights that can light in three different colors corresponding to three different conditions of the sensed distance. For instance, the first light 231 may light green to indicate that the distance detector does not sense a leading vehicle within a penalty distance of the user's vehicle. A second light 233 may light yellow to indicate that the user's vehicle is within a penalty distance but that the user has not violated a time limit for being within the penalty distance. A third light 235 may light red to indicate that the user's vehicle has violated a drafting rule. Other indicators may include an alphanumeric display, an audio output, or the like that can communicate to a user. Other options for communicating racing distance and penalty information are discussed herein. Accordingly, the indicator 130 may be mounted on or within the housing 105 or be separate from the housing 105 and located in a different place on or within the user's vehicle 110. The indicator 130 may be connected to communicate with the processing device 115 wirelessly or via a wired connections.

The processing device 125 is configured to monitor the signal from the distance sensing device 115 to determine whether the user's vehicle 110 is within a penalty distance and to monitor an amount of time that the user's vehicle 110 is within the penalty distance. Those skilled in the art will recognize and appreciate that such a processor can comprise a fixed-purpose hard-wired platform or can comprise a partially or wholly programmable platform or can include a plurality of processors working together. All of these architectural options are well known and understood in the art and require no further description here.

Figure 7:
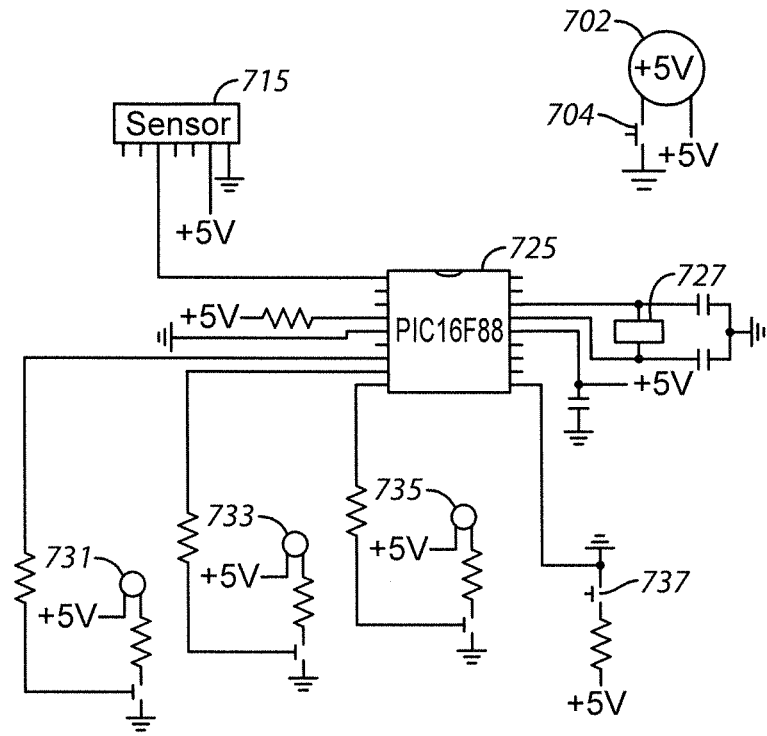
FIG. 7 is a circuit diagram of one example approach to a distance detector in accordance with various embodiments of the invention.

FIG. 7 illustrates one example circuit diagram for the apparatus 100. This includes a power source 702 such as a battery that provides a five volt power signal for the circuit and a power switch 704 that can turn on and off the apparatus 100 by connecting and disconnecting the power source 702. The distance sensor 715 is wired to a processor device 725 that is connected to a quartz crystal oscillator 727, which provides the timing signal for the processor device 725. Here, the indicator includes three separately wired light emitting diodes 731, 733, and 735 that are controlled by the processing device 725. This example also includes a user switch 737 that can start and stop the processing device's 725 tracking distance.

Figure 8:
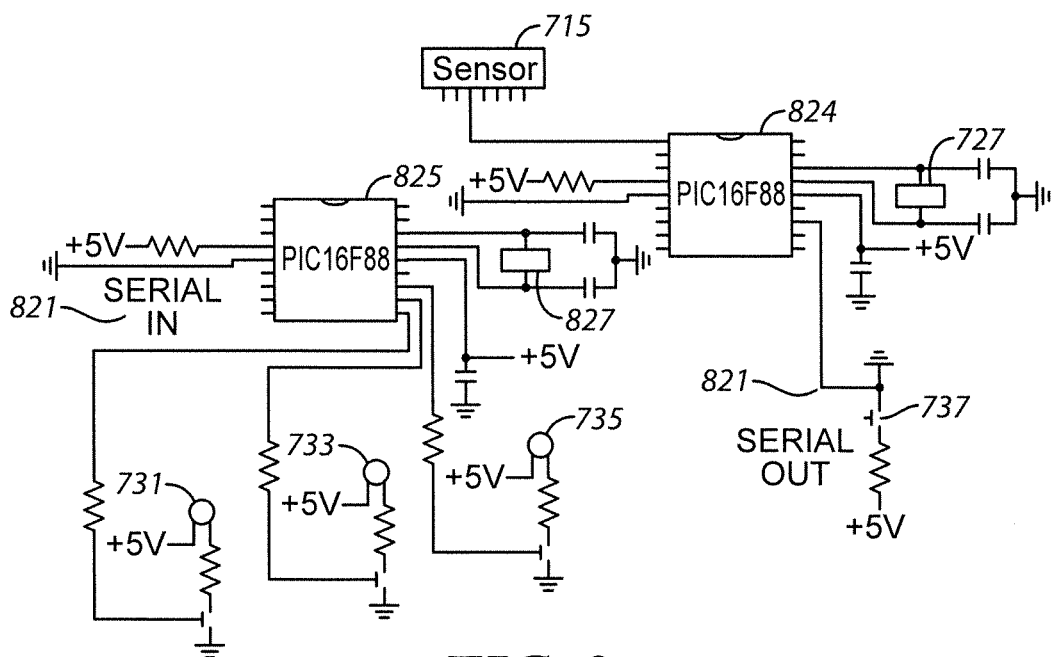
FIG. 8 is a circuit diagram of an example approach to a distance detector having two processors in accordance with various embodiments of the invention.

FIG. 8 illustrates another example circuit diagram, which example illustrates a two processor approach where a first processor 824 takes and averages signals from the sensor 715, which averaged results are provided over the serial line 821 to a second processor 825 (using a second oscillator 827) that makes the distance and penalty determinations as described herein.

The processing device 125 is further configured to control the indicator 130 to provide a first indication in response to determining that the user's vehicle 110 is within the penalty distance from a leading vehicle 120. This would correspond to the example of lighting a yellow light 233 as discussed with reference to FIG. 2. The processing device 125 can be further configured to control the indicator to provide a second indication in response to determining that the user's vehicle 110 is within the penalty distance from a leading vehicle 120 for more than a threshold amount of time. In the context of a triathlon, this second indication would be provided in response to sensing that the user's vehicle 110 is within the penalty distance of a leading vehicle 120 for more than 15 seconds. This second indication would correspond to the example of lighting a red light 235 as discussed with reference to FIG. 2. Similarly, the processing device 125 can be further configured to control the indicator 130 to provide an indication that the user's vehicle 110 is outside of the penalty distance of a leading vehicle 120. This indication would correspond to the example of lighting a green light 231 as discussed with reference to FIG. 2.

The processing device 125 can be further configured to take into account various race conditions that could determine whether a penalty is ultimately assessed. The following examples relate to triathlon rules governing the bicycle portion of the competition, but similar rules governing other situations can be applied. For instance, the processing device 125 can be configured to account for passing rules. In one example, the processing device 125 is configured to determine whether the user's vehicle 110 is decreasing the distance between the distance sensing device 115 and the leading vehicle 120 while the user's vehicle 110 is within the penalty distance. In response to determining that the distance is continually decreasing, the processing device 125 will not provide the second indication in response to determining that the user's vehicle 110 is within the penalty distance from a leading vehicle 120 for more than the threshold amount of time, thereby accounting for the user's vehicle 110 executing a pass of the leading vehicle 120.

In another example, various race courses may have stretches where drafting penalties are waived because of inevitable bunching of riders such as during long hill climbs or in particularly curved portions of the race course. Accordingly, the apparatus 100 can be configured to not indicate or record a penalty against the user when riding through these areas of the course. In one approach, the apparatus 100 includes a wireless receiver 140 operatively connected to the processing device 125. The wireless receiver 140 receives a disable wireless signal from a wireless transmitter 145 located along a race route. The processing device 125 in this case is configured to not monitor the signal from the distance detecting device 115 to determine whether the user's vehicle 110 is within the penalty distance in response to receiving a disable signal from the wireless receiver 140. The monitoring may automatically restart after a period of time after receiving the disable signal. In another approach, the wireless receiver 140 can be further configured to receive an enable wireless signal from a wireless transmitter 145 located along the race route such that the processing device 125 re-enables monitoring of the signal to determine whether the user's vehicle 110 is within the penalty distance in response to receiving an enable signal from the wireless receiver 140. These enable/disable transmitters 145 can be any short range or other wireless communication system that can signal to the apparatus 100 that is has passed a given point on the race course. This can include radio frequency identification signals (RFID) or others. Such systems are known for use in race situations to track timing of racers. Other such systems can be used. By still another approach, a GPS type system can be incorporated into the apparatus 100 to track location sufficient to toggle between an enabled and disabled mode with respect to tracking drafting penalties. In other approaches, the apparatus 100 can be configured to receive signals from transmitters 145 along the course to tag in time where the apparatus 100 passed the transmitters 145, and the course location can be correlated to a point in time in the apparatus 100 by the processing device 125. These methods may also be applied to activate and deactivate the apparatus 100 at the beginning and end of a race. So configured, the apparatus 100 is self-sufficient and does not require any other external hardware.

In another approach, the processing device 125 can receive speed signals regarding a speed of the user's vehicle 110 from a speedometer 150 or 155. The speedometer 150 can be mounted within the apparatus 100 or elsewhere on the user vehicle 110. The processing device 125 can determine an approximate location of the user's vehicle 110 based on a recorded history of the user's vehicle's speed by referencing a stored record of portions of the race course where drafting penalties will not be applied. Accordingly, the processing device 125 will not monitor the signal from the distance sensing device 115 to determine whether the user's vehicle 110 is within the penalty distance in response to determining that the user's vehicle 110 is in a portion of a race course exempt from drafting penalties. In still another approach, if the speed of the user's vehicle 110 decreases in a set way (as may occur when approaching a curve, climbing a slope, trying to avoid an obstacle, or trying to avoid a crash), the device 100 may be set to not assess a penalty.

In yet another approach, the device may be configured with certain pattern recognition algorithms to determine whether the sensed distance should be penalized or disregarded as fitting a pattern consistent with permissible riding such as riding in conditions where being within a drafting zone is permitted. For instance, the apparatus 100 may include an accelerometer 165, which is configured to detect vibration, connected to send signals to the processing device 125 regarding the amount of vibration detected. A rider may ride through a race course to record a vibration pattern for the course. A later rider can use the recorded vibration pattern as may be stored in the memory 160 by having the processing device 125 compare a presently detected vibration patterns sensed by the accelerometer 165 to determine where the user's vehicle 110 is within the course. The accelerometer 165 can further be used to sense deceleration or speed of the user's vehicle 110, which information the processing device 125 can use to disable tracking of penalties by determining based on the deceleration or speed that the user's vehicle 110 is in a portion of the race where drafting penalties are waived. For instance, the user's vehicle 110 can ride without drafting penalty when approaching a curve, climbing a slope, trying to avoid an obstacle, or trying to avoid a crash, each of which has a signature deceleration or speed reduction. By sensing the signature deceleration or speed reduction via the signals from the accelerometer 165 and/or other speed detection devices 150 and 155, the processing device 125 can responsively disable distance detection or penalty tracking.

Several use cases further illustrate how the apparatus 100 may operate. In a typical triathlon, when passing a rider, you are allowed to be in their slipstream for a maximum of 15 seconds. After this time period, drafting is penalized. There are no regulations about exiting the draft and getting back into it. As a result, a Triathlete could use the apparatus 100 to take advantage of this situation by entering the illegal drafting zone for 15 seconds, exiting, and re-entering all over again. Algorithms may be applied to avoid this result. For example, the apparatus 100 may be configured to track time in between exiting and re-entering the illegal drafting zone and/or track how often over a given time period a rider exits and re-enters the illegal drafting zone.

In another example, a rider is passing another rider, and the analog voltage signal from the distance sensing device 115 increases proportionally with the speed at which the rider is passing. If the analog voltage signal continues to increase during a course of 15 seconds, and there is a jump in the signal that would not be proportional to the user vehicle's 110 passing speed, no penalty is recorded. This does not matter whether the rider enters another drafting zone of the rider in front of them as long as the rider is still progressing forward on the next rider. If the rider is progressing forward, the rider will enter another 15 second passing period for the next passing session. This step through of passing sessions is called "Passing Progression."

Consider the example where a rider enters the draft of another rider, but the rider does not enter into a Passing Progression. If the rider does not progressively pass the Triathlete on the leading vehicle and instead exits the drafting zone before 15 seconds passes, penalties will be recorded for the duration that the rider traveled in the draft.

In still another example, a rider enters the draft of another rider beginning to progressively pass, but the rider fails to pass within 15 seconds. At the end of the 15 second passing period, recording of time in the penalty distance begins for reporting and assessment of penalties against the rider.

In yet another example, a rider enters the draft of another rider beginning to progressively pass, but the rider cannot manage the pass. Accordingly, the rider exits the drafting zone within the 15 second drafting period. The rider can either demonstrate a partial pass (Passing Progression for part of the drafting period, then exit left or right out of the draft—resulting in an analog jump in the signal from the distance sensing device 115), or the rider can perform a partial pass and then exit the draft in the reverse manner, in which case the analog voltage signal decreases as the distance between the riders grows. In either case, the apparatus does not record or indicate a penalty. These examples will be referred to as partial with bail, and partial with reverse exit, respectively.

Figure 9:
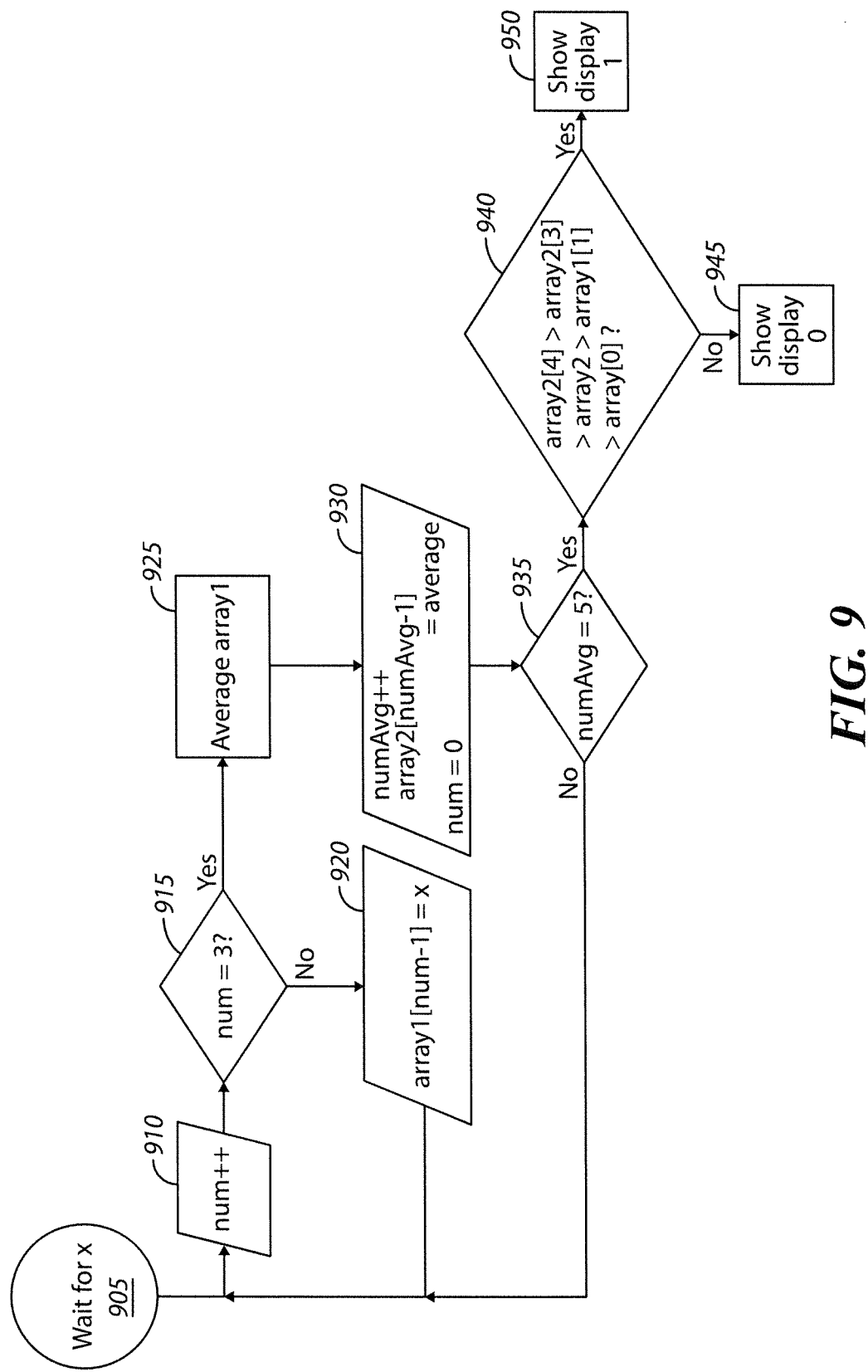
FIG. 9 is a flow chart illustrating an example process for reading signals from a distance sensing device in accordance with various embodiments of the invention.

FIG. 9 illustrates one example approach to detecting a Passing Progression. Here the processing device 125 waits 905 for a distance measurement and stores 910 it as a number. When using the sample collection method described above with reference to FIG. 6, a distance measurement is taken every second. Next, the processing device 125 determines 915 whether three samples have been taken. If not, the sample is stored 920 until a next sample is collected one second later. After three samples have been stored, the processing device 125 averages 925 the samples and stores 930 the averaged result in an array. Next the processing device 125 determines 935 whether the array stores five averaged results. If not, steps 905, 910, 915, 920, 925, and 930 are repeated until the array stores five averaged results. Then, the processing device 125 determines whether the averaged results increased sequentially, which would indicate that a sensed object such as a leading vehicle 120 is getting closer to the distance sensing device 115 over the fifteen second of collecting the information in the array. If not, the processing device 125 will control 945 the indicator to show one indicator to indicate a possibility of assessment of a penalty. If so, thereby indicating a Passing Progression, the processing device 125 will control 950 the indicator to show another indicator to indicate no assessment of a penalty at that time.

Unfortunately, some riders may try to trick the apparatus 100 by selectively entering and exiting the drafting zone or penalty distance to maximize drafting while not incurring a penalty as may be applied by the apparatus 100. In addition to application of the above processes to help discern the behavior of the rider, trickery of the apparatus 100 can be mitigated by tracking a history of the user vehicle's 110 entering and exiting the penalty distance and assessing a penalty if the history indicates abusive racing behavior. In one such approach, the apparatus 100 will include a memory 160 operatively connected to the processing device 125 such that the processing device 125 can store a history of the user's vehicle 110 entering and exiting the penalty distance from a leading vehicle 120 and determine a successive pattern in the user's vehicle 110 entering and exiting the penalty distance from a leading vehicle 120. In response to determining the successive pattern, the processing device 125 records in the memory device 170 a total amount of time that the user's vehicle 110 is within the penalty distance from a leading vehicle 120 during the successive pattern. For example, if a partial with bail and/or partial with reverse exit is repeated on the same rider and/or group of riders, the apparatus 100 can record the time that was spent in the drafting zone or penalty distance.

In addition to providing real time feedback to a user regarding distance determinations and the possible assessment of penalties, the apparatus 100 can be configured to store this information and provide it to a race official for assessment of any accrued penalties. In one approach, the apparatus 100 includes a memory device 160 operatively connected to the processing device 125 such that the processing device 125 stores in the memory device 160 a number of times that the user's vehicle 110 was within the penalty distance of a leading vehicle 120 for more than the threshold amount of time. This information can then be sent from the memory device 160 or accessed in the memory device 160 for assessment of the penalties. For instance, the apparatus 100 may include a wireless transmitter 170 configured to transmit information conveying the number of times that the user's vehicle 110 was within the penalty distance of a leading vehicle 120 for more than the threshold amount of time to a device reader 175. The device reader 175 may be disposed at the end of a bicycle portion of a triathlon or held by a race official to read this information from the apparatus 100 immediately upon the user's completing the bicycle course. The transmitter 170 and receiver 140 may be separate or combined devices as known in the art and capable of supporting the wireless communication discussed here. By another approach, the processing device 125 can control the indicator 130 to provide relevant penalty information such as an indication conveying the number of times that the user's vehicle was within the penalty distance of a leading vehicle for more than the threshold amount of time, which indication can come at the end of the bicycle course for reading by a race official who will implement any penalties. Other options include having at least a portion of the memory device 160 being a removable memory that is readily read by another device to assess penalty related or other racing information.

It should be noted that various combinations of various aspects of the above described approaches and modifications to the presently preferred embodiments described herein will be apparent to those skilled in the art in view of this disclosure. For instance, the teachings of this disclosure may be readily modified to apply in a variety of other settings that deal with motion, patterns, proximity, or distance regulation/monitoring. Such settings include, for example, medicine where biomechanics or biochemistry use motion capture and motion recognition, monitoring and recognizing motions and movement patterns, or recognizing blood flow and fluid motion or musculoskeletal motions where the device was significantly reduced in size. Other settings include NASCAR or Formula One Racing for monitoring and/or regulating distance between cars, traffic monitoring systems for recognizing patterns and using them to communicate heavy traffic areas or road use, traffic safety where car distances are monitored for safety and for car/pedestrian distance monitoring, go-cart racing for keeping a safe distance between carts, driving lessons to monitor tailgating, road kill/animal-vehicle safety for alerting when animals cross roads, security systems to recognize patterns of movement and sound alarms, fitness monitoring systems for estimating energy expenditure by recognizing activities, motion pattern detectors for recognizing motions of people doing work in a factory, animals in their environment, and the like for research purposes, and weather monitoring for recording and monitoring movement of plants and trees to detect wind patterns (or wave patterns) to alert when storms are likely to occur. Such changes and modifications may be made without departing from the scope of the present invention and without diminishing its attendant advantages.

What is claimed is:

1. An apparatus for monitoring distance behind a moving vehicle, the apparatus comprising:
   a housing configured to mount to a user's vehicle, the housing containing at least:
      a self-contained distance sensing device configured to sense a distance between the distance sensing device as mounted on a user's vehicle and a leading vehicle and to output a signal proportional to the distance,
      a processing device in communication with the distance sensing device to receive the signal;
      an indicator operatively connected to receive signals from the processing device to control provision of an indication to the user regarding application of distance based rules to the user's vehicle.

2. The apparatus of claim 1 wherein the processing device is configured to monitor the signal to determine whether the user's vehicle is within a penalty distance and to monitor an amount of time that the user's vehicle is within the penalty distance.

3. The apparatus of claim 2 wherein the processing device is further configured to control the indicator to provide a first indication in response to determining that the user's vehicle is within the penalty distance from a leading vehicle.

4. The apparatus of claim 3 wherein the processing device is further configured to control the indicator to provide a second indication in response to determining that the user's vehicle is within the penalty distance from a leading vehicle for more than a threshold amount of time.

5. The apparatus of claim 4 wherein the processing device is further configured to:
   determine whether the user's vehicle is decreasing the distance between the distance sensing device and the leading vehicle while the user's vehicle is within the penalty distance, and
   in response to determining that the distance is continually decreasing, not providing the second indication in response to determining that the user's vehicle is within the penalty distance from a leading vehicle for more than the threshold amount of time.

6. The apparatus of claim 5 further comprising a memory device operatively connected to the processing device, wherein the processing device is configured to:
   store a history of the user's vehicle entering and exiting the penalty distance from a leading vehicle,
   determine a successive pattern in the user's vehicle entering and exiting the penalty distance from a leading vehicle, and
   in response to determining the successive pattern, recording in the memory device a total amount of time that the user's vehicle is within the penalty distance from a leading vehicle during the successive pattern.

7. The apparatus of claim 5 further comprising a memory device operatively connected to the processing device, wherein the processing device is configured to store in the memory device a number of times that the user's vehicle was within the penalty distance of a leading vehicle for more than the threshold amount of time.

8. The apparatus of claim 5 further comprising a wireless transmitter configured to transmit information conveying the number of times that the user's vehicle was within the penalty distance of a leading vehicle for more than the threshold amount of time.

9. The apparatus of claim 5 wherein the processing device is further configured to control the indicator to provide an indication conveying the number of times that the user's vehicle was within the penalty distance of a leading vehicle for more than the threshold amount of time.

10. The apparatus of claim 2 wherein the processing device is further configured to control the indicator to provide an indication that the user's vehicle is outside of the penalty distance of a leading vehicle.

11. The apparatus of claim 2 further comprising a wireless receiver operatively connected to the processing device and configured to receive a disable wireless signal from a wireless transmitter located along a race route, wherein the processing device is configured to not monitor the signal to determine whether the user's vehicle is within the penalty distance in response to receiving a disable signal from the wireless receiver.

12. The apparatus of claim 11 further comprising the wireless receiver's being configured to receive an enable wireless signal from a wireless transmitter located along the race route, wherein the processing device is configured to re-enable monitoring the signal to determine whether the user's vehicle is within the penalty distance in response to receiving an enable signal from the wireless receiver.

13. The apparatus of claim 2 wherein the processing device is configured to:

receive speed signals regarding a speed of the user's vehicle;

determine an approximate location of the user's vehicle based on a recorded history of the user's vehicle's speed;

not monitor the signal to determine whether the user's vehicle is within the penalty distance in response to determining that the user's vehicle is in a portion of a race course exempt from drafting penalties.

14. The apparatus of claim 2 wherein the processing device is further configured to control the indicator to provide a real-time indication to the user regarding a determination of whether the user's vehicle is within the penalty distance from a leading vehicle.

15. An apparatus for monitoring distance behind a moving vehicle, the apparatus comprising:
a housing configured to mount to a user's vehicle, the housing containing at least:
a distance sensing device configured to output a signal proportional to a distance between the distance sensing device and a leading vehicle,
a processing device in communication with the distance sensing device to receive the signal;
an indicator operatively connected to receive signals from the processing device to control provision of an indication to the user regarding application of distance based rules to the user's vehicle:
a mount, the mount comprising:
a base defining a curved side configured to engage a support structure of the user's vehicle;
a shaft extending from a side of the base opposite that of the curved side, the shaft including at least one flange;
wherein the housing defines a curved slot on a least two of the housing's sides, the curved slot sized to engage and receive the shaft and the at least one flange to securely position the housing relative to the user's vehicle's structure.

16. A method for monitoring distance behind a moving vehicle, the method comprising:
sensing by a distance sensing device a distance between the distance sensing device as mounted on a user's vehicle and a leading vehicle;
outputting a signal from the distance sensing device to a processing device, the signal proportional to the distance between the distance sensing device and the leading vehicle;
effecting provision of an indication to the user from an indicator regarding application of distance based rules to the user's vehicle based on the sensing by the distance sensing device.

17. The method of claim 16 further comprising:
monitoring the signal to determine whether the user's vehicle is within a penalty distance; and
monitoring an amount of time that the user's vehicle is within the penalty distance.

18. The method of claim 17 further comprising controlling the indicator to provide a first indication in response to determining that the user's vehicle is within the penalty distance from a leading vehicle.

19. The method of claim 18 further comprising controlling the indicator to provide a second indication in response to determining that the user's vehicle is within the penalty distance from a leading vehicle for more than a threshold amount of time.

20. The method of claim 19 further comprising:
determining whether the user's vehicle is decreasing the distance between the distance sensing device and the leading vehicle while the user's vehicle is within the penalty distance; and
in response to determining that the distance is continually decreasing, not providing the second indication in response to determining that the user's vehicle is within the penalty distance from a leading vehicle for more than the threshold amount of time.

21. The method of claim 20 further comprising
determining a successive pattern in the user's vehicle entering and exiting the penalty distance from a leading vehicle, and
in response to determining the successive pattern, recording a total amount of time that the user's vehicle is within the penalty distance from a leading vehicle during the successive pattern.

22. The method of claim 20 further comprising storing a number of times that the user's vehicle was within the penalty distance of a leading vehicle for more than the threshold amount of time.

23. The method of claim 20 further comprising transmitting information conveying the number of times that the user's vehicle was within the penalty distance of a leading vehicle for more than the threshold amount of time.

24. The method of claim 20 further comprising controlling the indicator to provide an indication conveying the number of times that the user's vehicle was within the penalty distance of a leading vehicle for more than the threshold amount of time.

25. The method of claim 17 further comprising controlling the indicator to provide an indication that the user's vehicle is outside of the penalty distance of a leading vehicle.

26. The method of claim 17 further comprising:
receiving a disable wireless signal from a wireless transmitter located along a race route; and
not monitoring the signal to determine whether the user's vehicle is within the penalty distance in response to receiving the disable wireless signal.

27. The method of claim 26 further comprising:
receiving an enable wireless signal from a wireless transmitter located along the race route; and
monitoring the signal to determine whether the user's vehicle is within the penalty distance in response to receiving the enable wireless signal.

28. The method of claim 17 further comprising:
receiving speed signals regarding a speed of the user's vehicle;
determining an approximate location of the user's vehicle based on a recorded history of the user's vehicle's speed;
not monitoring the signal to determine whether the user's vehicle is within the penalty distance in response to determining that the user's vehicle is in a portion of a race course exempt from drafting penalties.

\* \* \* \* \*